(12) United States Patent
Yamanashi

(10) Patent No.: US 11,588,280 B2
(45) Date of Patent: Feb. 21, 2023

(54) CONNECTOR WITH TEMPERATURE SENSOR IN TERMINAL

(71) Applicant: Yazaki Corporation, Tokyo (JP)

(72) Inventor: Daisuke Yamanashi, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 85 days.

(21) Appl. No.: 17/335,550

(22) Filed: Jun. 1, 2021

(65) Prior Publication Data
US 2021/0384681 A1 Dec. 9, 2021

(30) Foreign Application Priority Data
Jun. 3, 2020 (JP) .............................. JP2020-096589

(51) Int. Cl.
*H01R 13/66* (2006.01)
*H01R 13/506* (2006.01)
*H01R 13/52* (2006.01)

(52) U.S. Cl.
CPC ....... *H01R 13/6683* (2013.01); *H01R 13/506* (2013.01); *H01R 13/5202* (2013.01); *H01R 2201/26* (2013.01)

(58) Field of Classification Search
CPC ..................... H01R 13/6683; H01R 2201/26
See application file for complete search history.

(56) References Cited

U.S. PATENT DOCUMENTS

| 9,570,862 B2* | 2/2017 | Kawai ................... H01R 13/04 |
| 10,153,598 B2* | 12/2018 | Watanabe ................ H01C 1/01 |
| 10,644,462 B2* | 5/2020 | Shimizu .................. H01R 4/72 |
| 2014/0144011 A1 | 5/2014 | Sugimoto et al. |
| 2016/0111831 A1 | 4/2016 | Kawai et al. |
| 2016/0111842 A1 | 4/2016 | Sugimoto et al. |
| 2018/0159280 A1 | 6/2018 | Watanabe et al. |
| 2019/0334293 A1 | 10/2019 | Iwami et al. |
| 2021/0384682 A1* | 12/2021 | Yamanashi ........ H01R 13/6683 |

FOREIGN PATENT DOCUMENTS

| DE | 20201632 U1 | 5/2002 |
| DE | 202010009329 U1 | 10/2010 |
| DE | 11 2014 003 014 T5 | 3/2016 |
| DE | 202018002686 U1 | 7/2018 |
| JP | 2013-030274 A | 2/2013 |
| JP | 2019-192482 A | 10/2019 |
| JP | 3225148 U | 2/2020 |

* cited by examiner

*Primary Examiner* — Tho D Ta
(74) *Attorney, Agent, or Firm* — Sughrue Mion, PLLC

(57) ABSTRACT

A connector includes a terminal, a housing, and a temperature sensor. The terminal includes a terminal connection portion that is electrically connected to a counterpart terminal, a wire connection portion that is electrically connected to a wire, and a tubular portion that is located between the terminal connection portion and the wire connection portion and is formed in a tubular shape having a space portion (accommodation space portion). The temperature sensor is disposed in the space portion of the terminal. The tubular portion is accommodated inside the housing in a state where the terminal is held by the housing.

4 Claims, 10 Drawing Sheets

CONNECTOR WITH TEMPERATURE SENSOR IN TERMINAL

CROSS-REFERENCE TO RELATED APPLICATION(S)

The present application claims priority to and incorporates by reference the entire contents of Japanese Patent Application No. 2020-096589 filed in Japan on Jun. 3, 2020.

BACKGROUND OF THE INVENTION

1. Field of the Invention

The present invention relates to a connector.

2. Description of the Related Art

Some connectors mounted on vehicles are provided in the middle of wires that supply power from a power supply to electronic devices. Further, a high voltage is applied to the wire for power supply. The connector includes a terminal provided on an end of the wire and a temperature sensor that detects a temperature of the terminal, and prevents an overcurrent from flowing from the power supply to the electronic devices on the basis of a detection result of the temperature sensor.

In the connector, a space for accommodating at least a part of the terminal and a space for accommodating the temperature sensor are provided in a housing (for example, see Japanese Patent Application Laid-open No. 2013-30274). However, if the space for accommodating a part of the terminal and the space for accommodating the temperature sensor are individually provided in the housing, the housing becomes large. Further, if the housing becomes large, the connector becomes large.

SUMMARY OF THE INVENTION

The present invention has been made in view of the above circumstances, and an object of the present invention is to provide a small connector.

In order to achieve the above mentioned object, a connector according to one aspect of the present invention includes a conductive terminal that comes into contact with a counterpart terminal; a temperature sensor that detects a temperature of the terminal; and an insulating housing, wherein the terminal includes a terminal connection portion that is electrically connected to the counterpart terminal, a wire connection portion that is electrically connected to a wire, and a tubular portion that is located between the terminal connection portion and the wire connection portion and is formed in a tubular shape having a space portion, the temperature sensor is disposed in the space portion of the terminal, and the tubular portion is accommodated inside the housing in a state where the terminal is held by the housing.

According to another aspect of the present invention, in the connector, it is preferable that the terminal is formed of a single conductive metal plate-shaped member in a deployed state.

According to still another aspect of the present invention, in the connector, it is preferable that the housing holds a plurality of terminals, and the temperature sensor is disposed in the space portion of each of the terminal.

According to still another aspect of the present invention, in the connector, it is preferable that the housing is formed so as to extend along an axial direction, the terminal connection portion has an outer portion located on an outermost side with respect to an axis of the housing in an orthogonal direction orthogonal to the axial direction when viewed from the axial direction, and the temperature sensor is located inside the outer portion when viewed from the axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
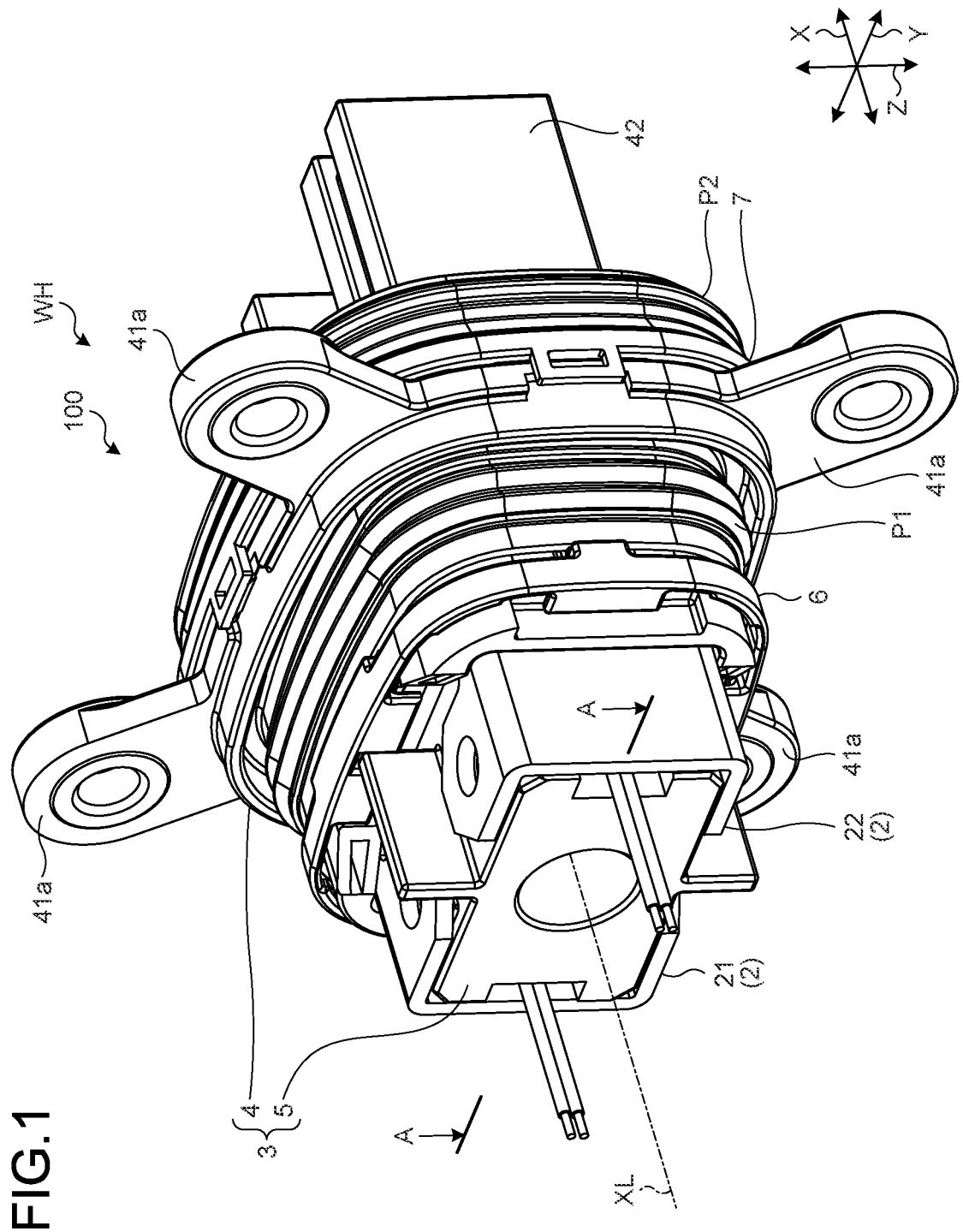
FIG. 1 is a perspective view of a connector according to the present embodiment.
Figure 2:
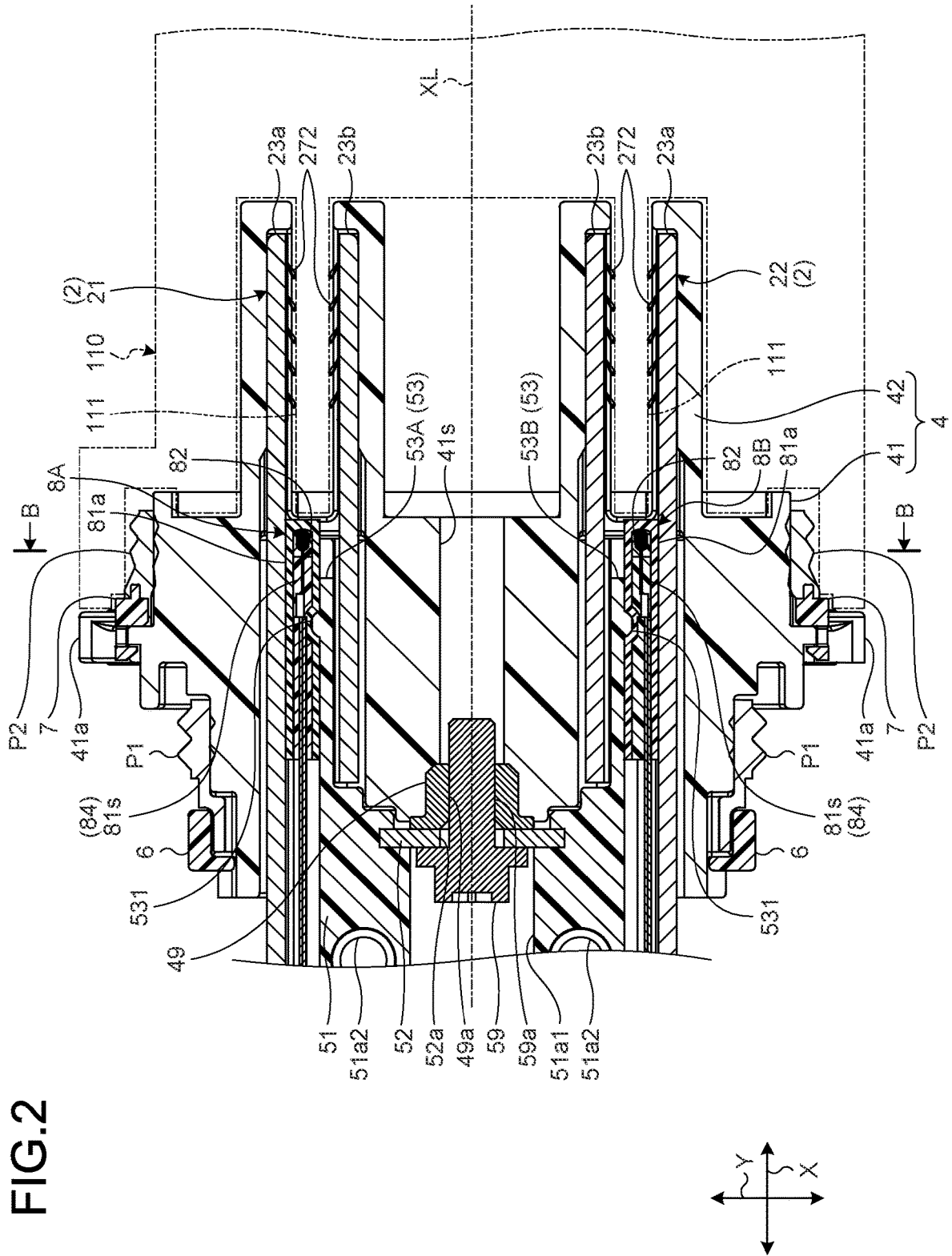
FIG. 2 is a vertical cross-sectional view taken along an arrow A-A of FIG. 1.
Figure 3:
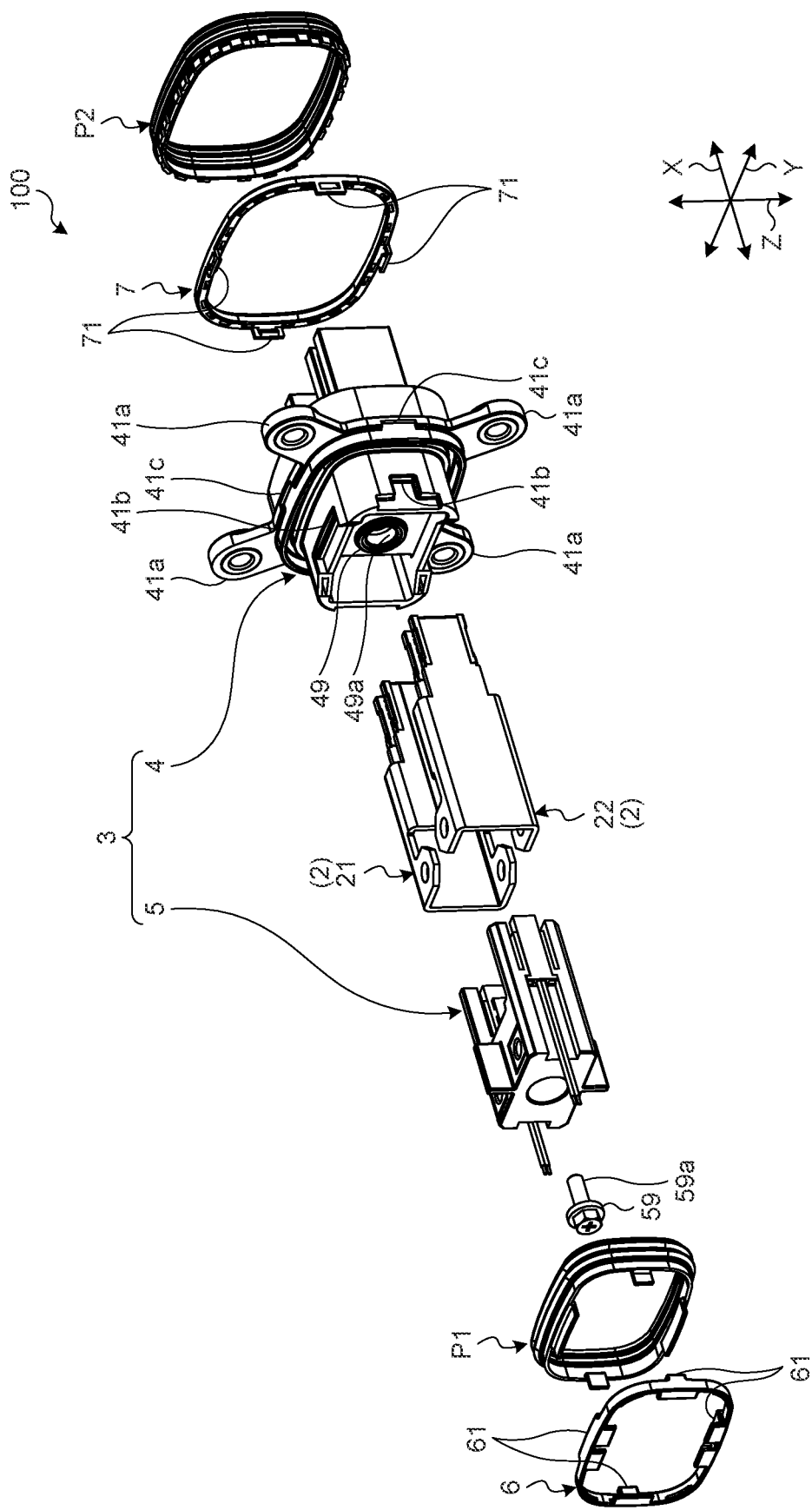
FIG. 3 is an exploded perspective view of the connector according to the present embodiment.
Figure 4:
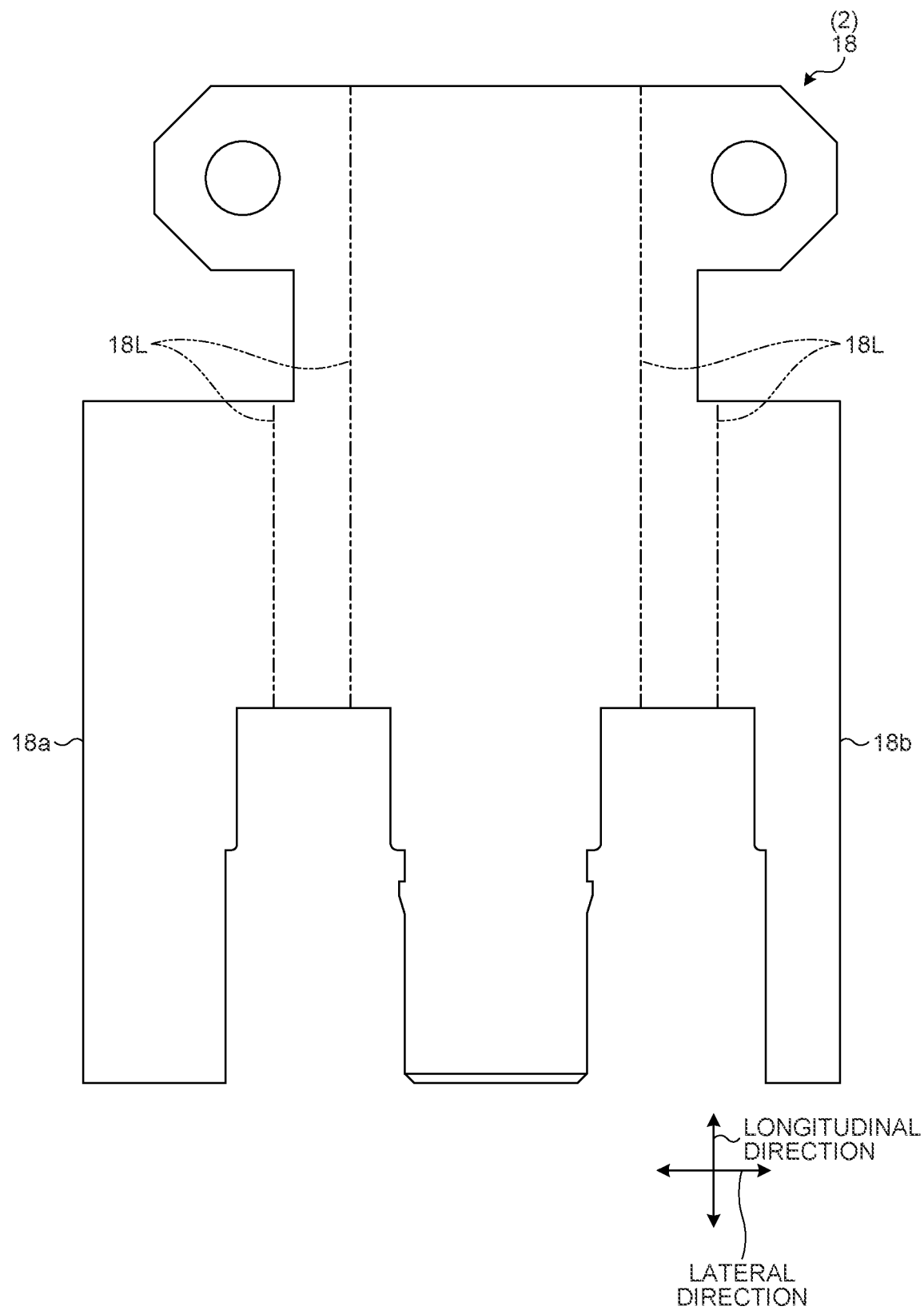
FIG. 4 is a plan view illustrating a deployed state of terminals included in the connector according to the present embodiment.
Figure 5:
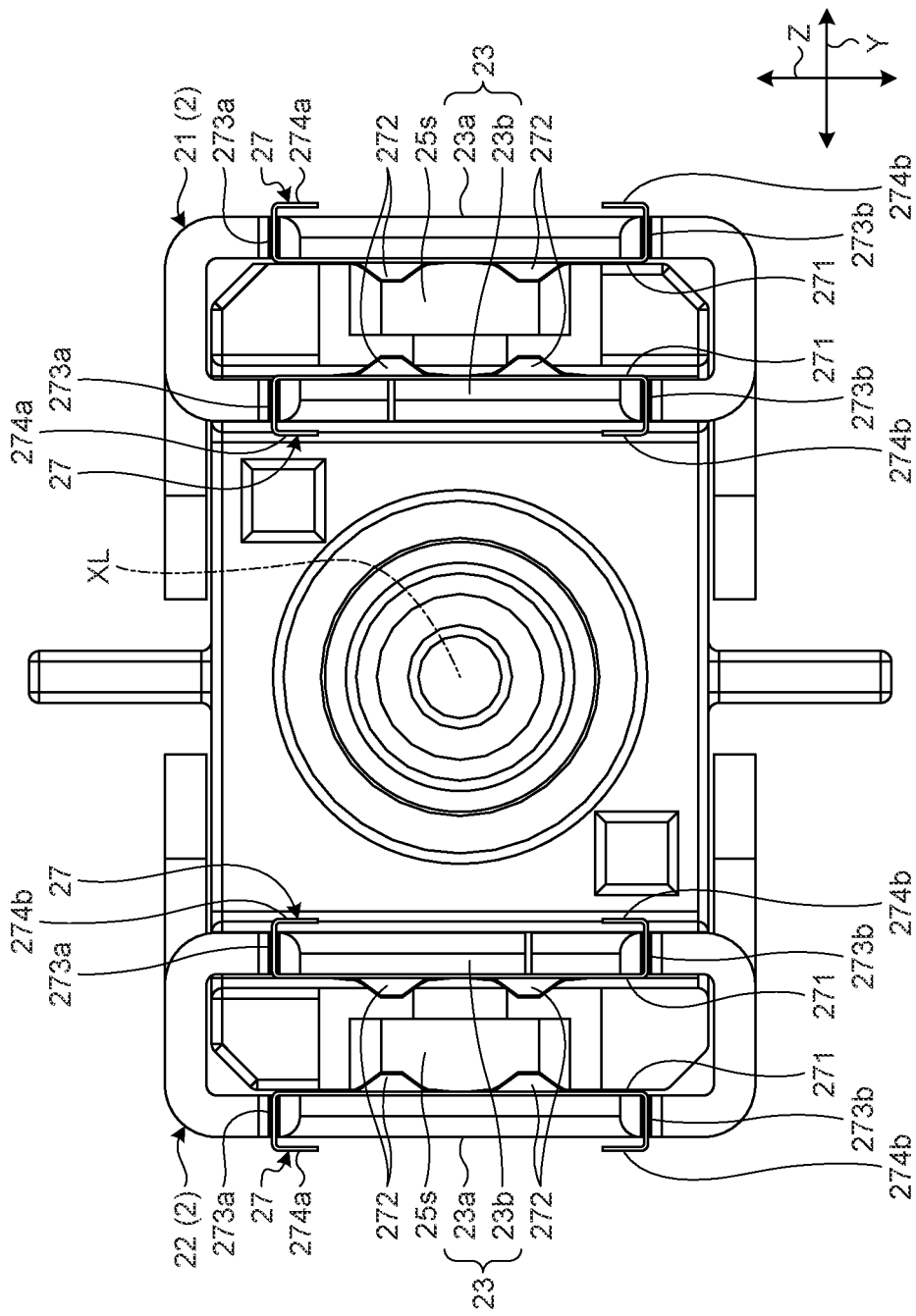
FIG. 5 is a front view of a terminal and a holding member as viewed from the front side of an axial direction.
Figure 6:
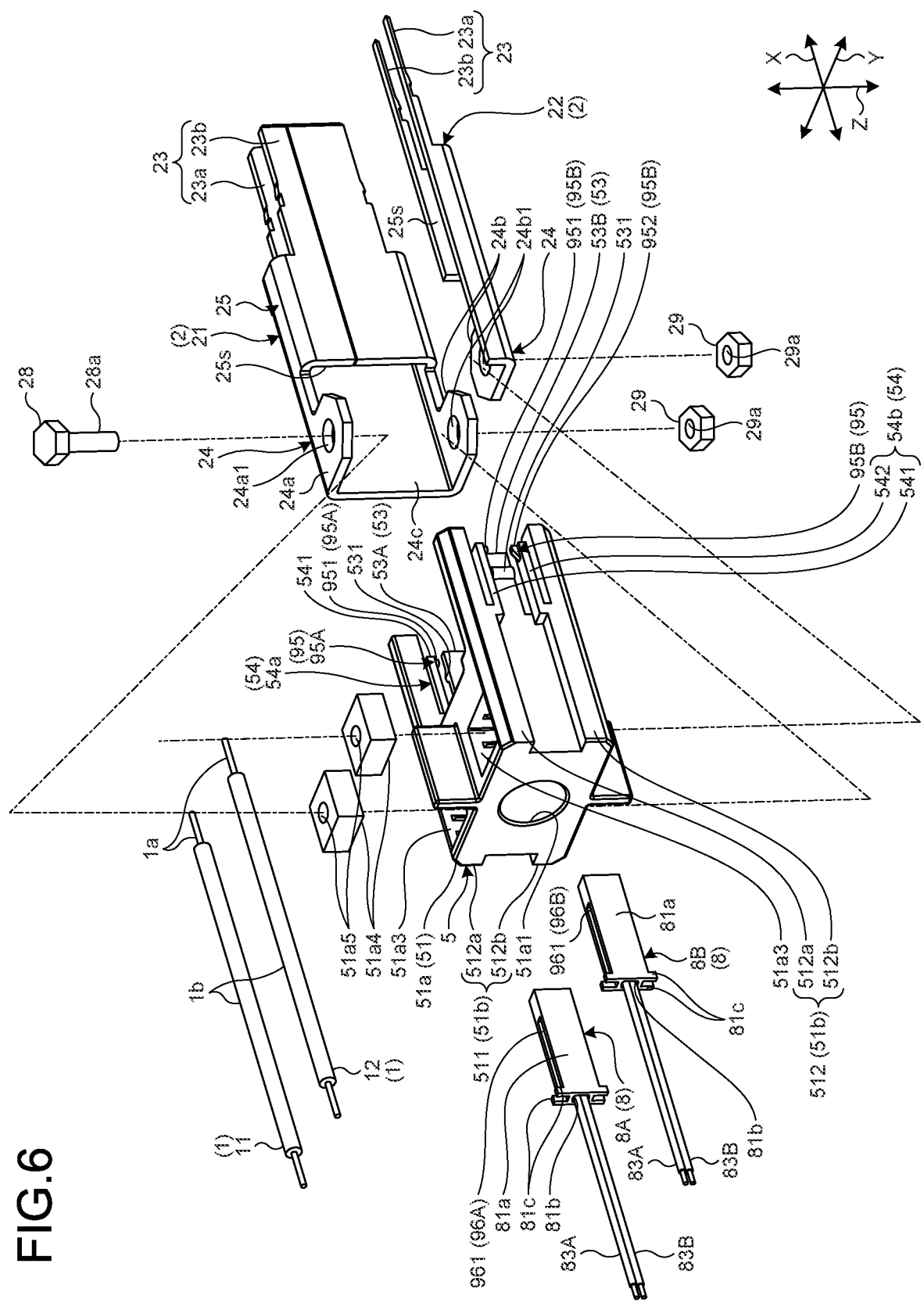
FIG. 6 is an exploded perspective view of the terminal, the holding member, and a temperature sensor in the connector according to the present embodiment.
Figure 7:
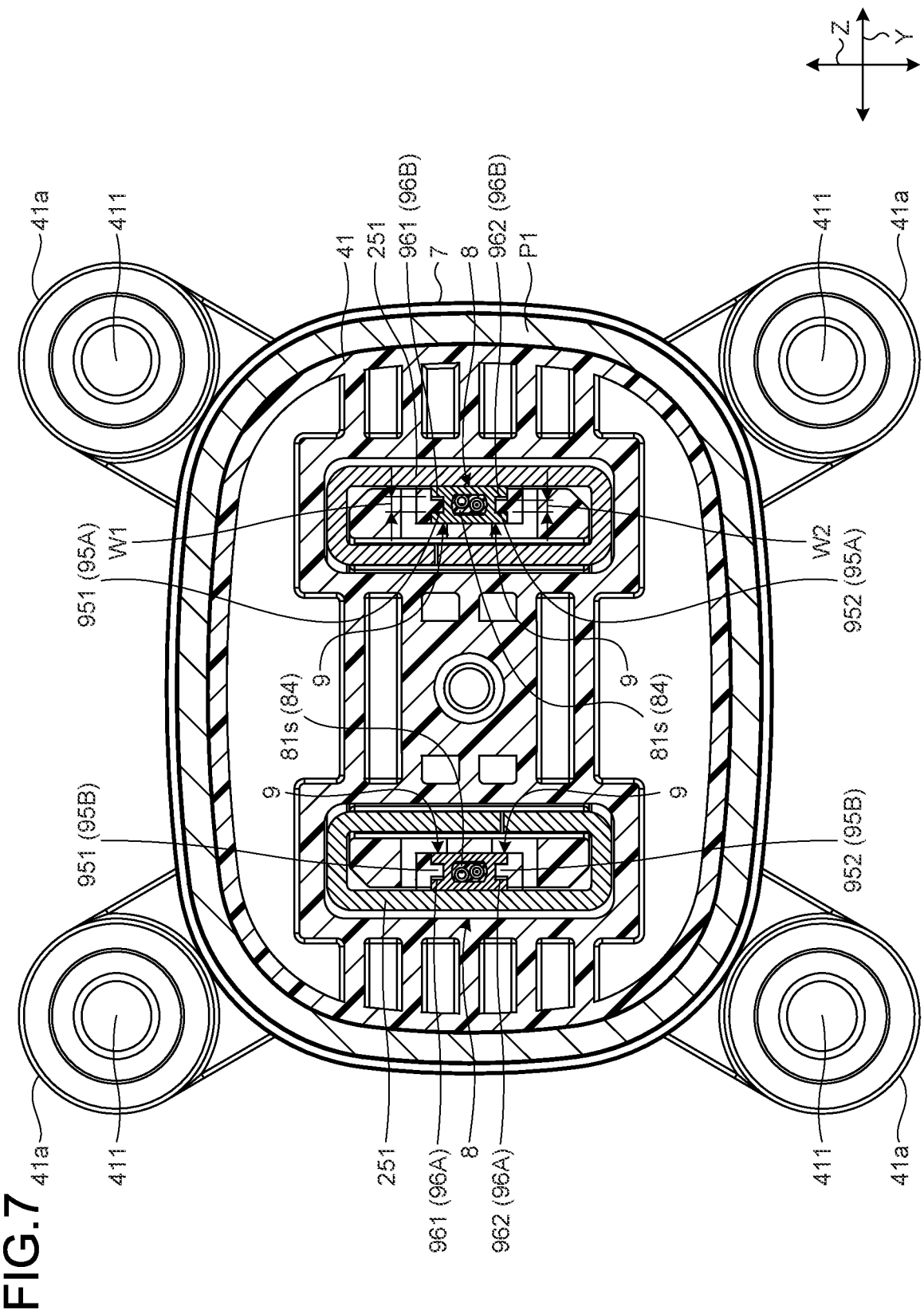
FIG. 7 is a transverse cross-sectional view taken along an arrow B-B of FIG. 2.
Figure 8:
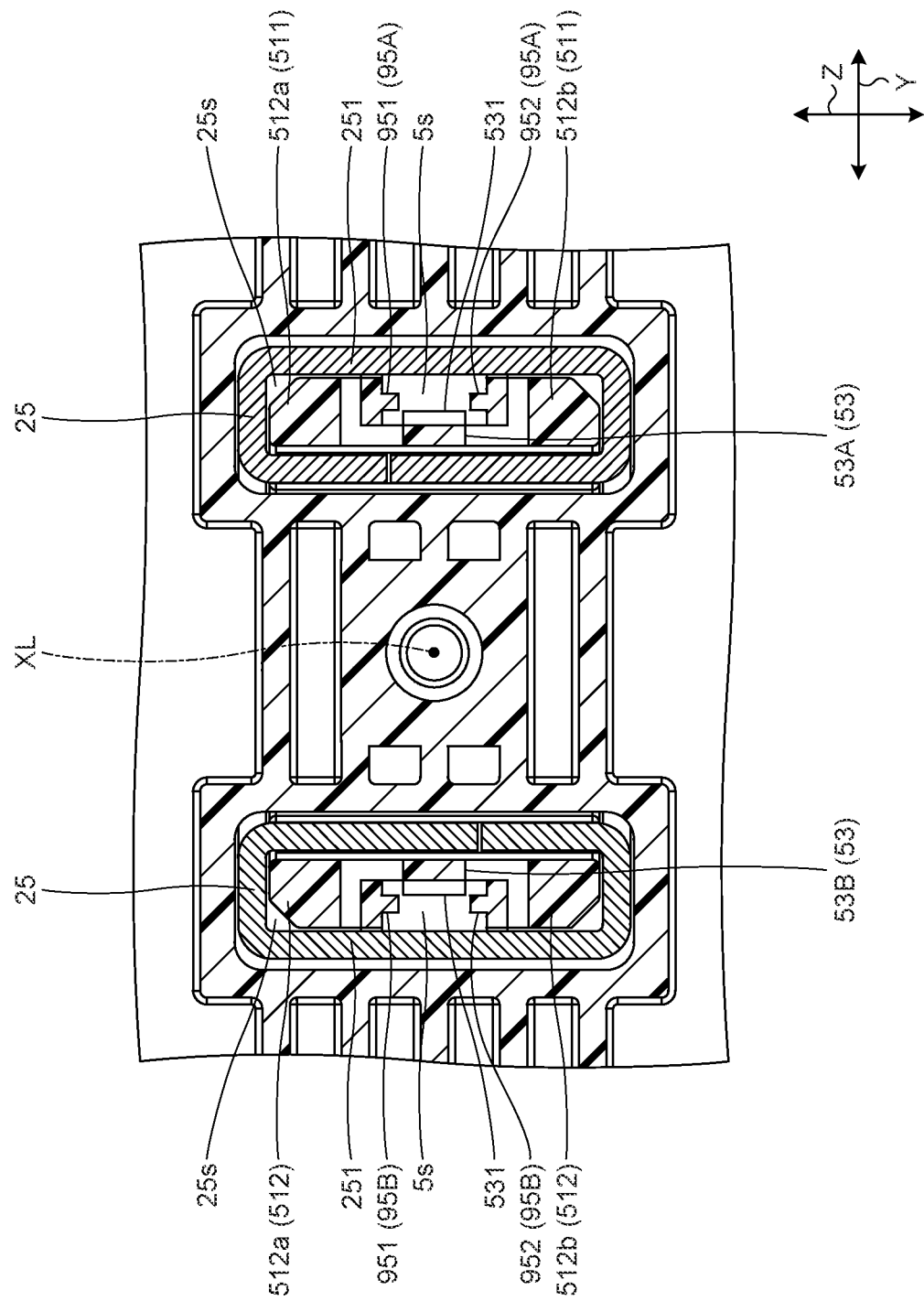
FIG. 8 is a partially enlarged cross-sectional view before the temperature sensor is attached to the holding member in FIG. 7.
Figure 9:
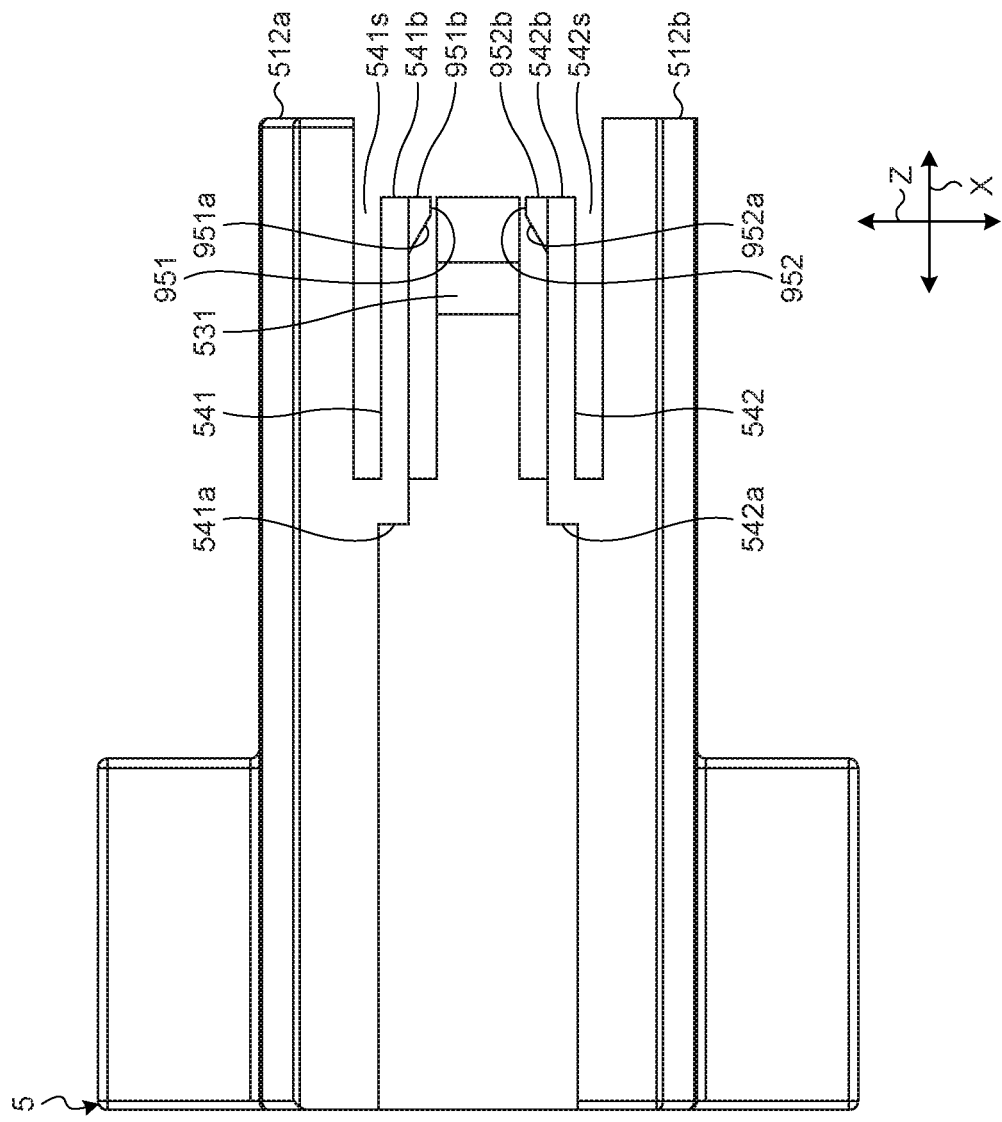
FIG. 9 is a side view of the holding member.
Figure 10:
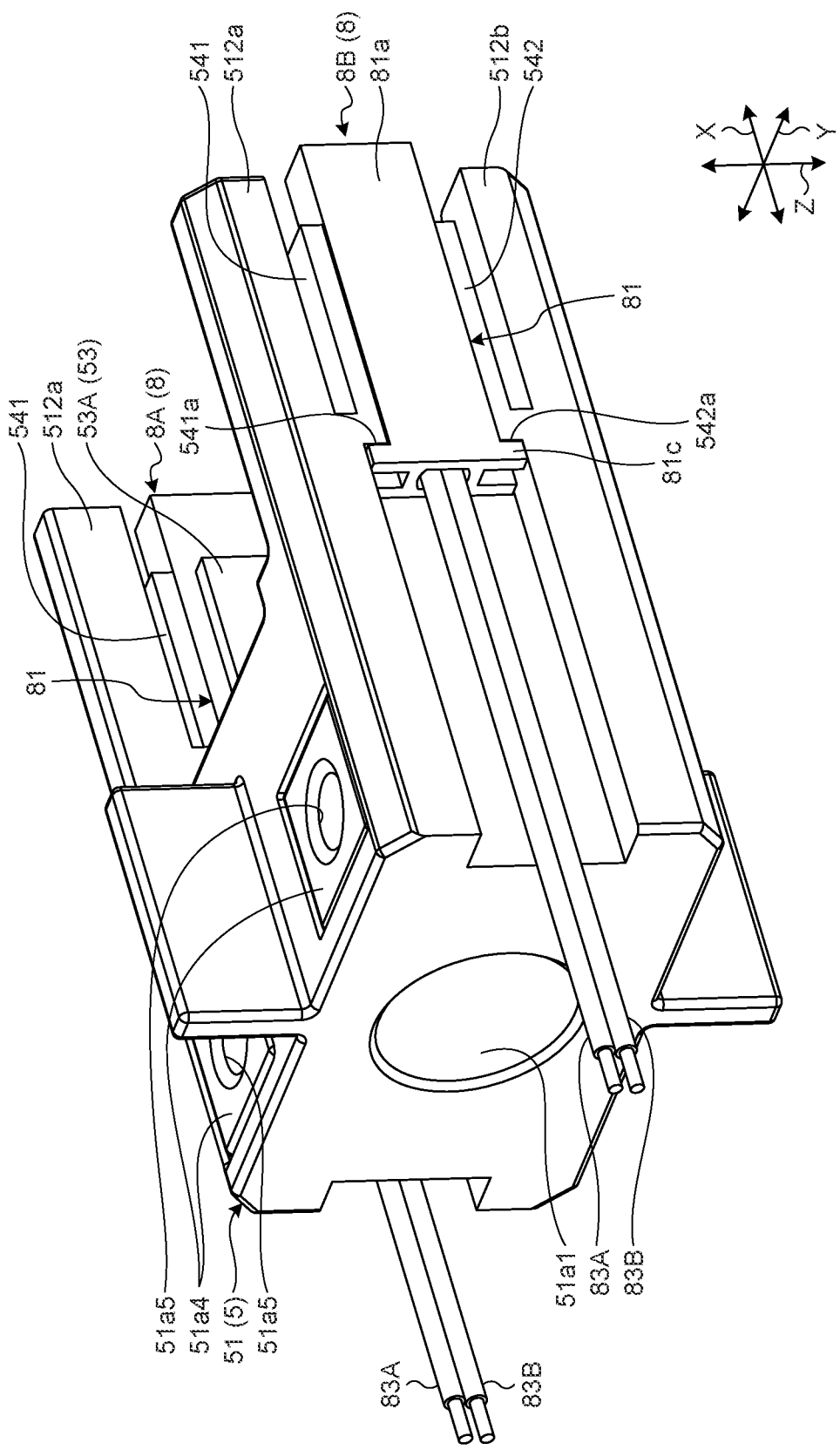
FIG. 10 is a perspective view illustrating the holding member and the temperature sensor included in the connector according to the present embodiment.

FIG. 1 is a perspective view of a connector 100 according to the present embodiment. FIG. 2 is a vertical cross-sectional view taken along an arrow A-A of FIG. 1. FIG. 3 is an exploded perspective view of the connector 100 according to the present embodiment. FIG. 4 is a plan view illustrating a deployed state of terminals 2 included in the connector 100 according to the present embodiment. FIG. 5 is a front view of a terminal 2 and a holding member 5 as viewed from the front side of an axial direction X. FIG. 6 is an exploded perspective view of the terminal 2, the holding member 5, and a temperature sensor 8 in the connector 100 according to the present embodiment. FIG. 7 is a transverse cross-sectional view taken along an arrow B-B of FIG. 2. FIG. 8 is a partially enlarged cross-sectional view before the temperature sensor 8 is attached to the holding member 5 in FIG. 7. FIG. 9 is a side view of the holding member 5. FIG. 10 is a perspective view illustrating the holding member 5 and the temperature sensor 8 included in the connector 100 according to the present embodiment. Note that, in FIG. 6, a part of a second terminal 22 located on the other side in a first orthogonal direction Y in a pair of terminals 2 included in the connector 100 according to the present embodiment is cut and illustrated, and one of bolts 28 is omitted.

As illustrated in FIGS. 1 to 10, the X direction is an axial direction of the connector 100 in the present embodiment.

The Y direction is a first orthogonal direction (orthogonal direction) Y orthogonal to the axial direction X of the connector 100. The Z direction is a second orthogonal direction orthogonal to each of the axial direction X and the first orthogonal direction Y of the connector 100. In the axial direction X in the present specification, the side close to a counterpart connector 110 may be referred to as the front side, and the side separated from the counterpart connector 110 may be referred to as the rear side.

The connector 100 according to the present embodiment illustrated in FIG. 1 is applied to, for example, a wire harness WH used in a vehicle such as an automobile. In the wire harness WH, for example, for connection between electric devices mounted on the vehicle, a plurality of wires 1 used for power supply or the like are bundled into a collective part, and each wire 1 is connected to each electric device by the connector 100 or the like. The wire harness WH includes the connector 100 and the plurality of wires 1 (see FIG. 6). The wire harness WH may be configured to further include a grommet, a protector, an exterior material, a fixture, and the like. The connector 100 according to the present embodiment is used in, for example, the wire harness WH having the wires 1 for power supply supplying power from a battery to a motor in a vehicle such as a hybrid automobile or an electric automobile.

The connector 100 is fitted into a counterpart connector 110 illustrated in FIG. 2, so that the connector 100 can electrically connect its own terminal 2 and a counterpart terminal 111 of the counterpart connector 110. In other words, the connector 100 is used in a connection mechanism for wire-to-wire connection electrically connecting the wire 1 connected to the terminal 2 and a counterpart wire connected to the counterpart terminal 111, by electrically connecting its own terminal 2 and the counterpart terminal 111 of the counterpart connector 110.

As illustrated in FIG. 3, the connector 100 according to the present embodiment includes terminals 2, a housing 3, a first packing P1, a first holder 6, a second packing P2, a second holder 7, a temperature sensor 8, and a holding structure 9 (see FIG. 7).

The terminal 2 is made of conductive metal and is electrically connected to the end of wire 1 (see FIG. 6). The terminal 2 illustrated in FIG. 2 to be described in the present embodiment is, for example, a female terminal, and the counterpart terminal 111 is, for example, a male terminal.

The connector 100 according to the present embodiment has a pair of terminals 2, and the pair of terminals 2 are disposed line-symmetrically with respect to a plane that includes an axis XL and is orthogonal to the first orthogonal direction Y (FIG. 5). Therefore, a first terminal 21 to be one of the pair of terminals 2 will be described below, and the description of a second terminal 22 to be the remaining terminal 2 will be omitted.

As illustrated in FIG. 6, the first terminal 21 is electrically connected to an end of a first wire 11. The first terminal 21 is formed by forming a flat plate-shaped member 18 illustrated in FIG. 4 by performing punching from a metal such as copper having conductivity and bending a plurality of bending lines 18L in the flat plate-shaped member 18. The flat plate-shaped member 18 has a longitudinal direction and a lateral direction in which the length is shorter than the length in the longitudinal direction. The flat plate-shaped member 18 extends in the longitudinal direction, for example, and forms the terminal 2 having a tubular portion 25 and the like to be described later by welding a pair of connection end portions 18a and 18b located at both end portions in the lateral direction, respectively. The first terminal 21 formed as described above and illustrated in FIG. 6 includes a terminal connection portion 23, a wire connection portion 24, and the tubular portion 25. Note that the second terminal 22 is electrically connected to an end of a second wire 12.

The terminal connection portion 23 is a portion that is electrically connected to the counterpart terminal 111 by coming into contact with the counterpart terminal 111 illustrated in FIG. 2. The terminal connection portion 23 is located on the front side in the axial direction X and is disposed inside a cover 4, which will be described later. The terminal connection portion 23 has an outer portion 23a and an inner portion 23b that face each other in the first orthogonal direction Y. The outer portion 23a and the inner portion 23b are formed in a rectangular flat plate shape. As illustrated in FIG. 5, a plate thickness direction of the outer portion 23a is along the first orthogonal direction Y, and the outer portion 23a is located on the outermost side with respect to the axis XL of the housing 3 when viewed from the axial direction X. A plate thickness direction of the inner portion 23b is along the first orthogonal direction Y, and the inner portion 23b is located inside the outer portion 23a with respect to the axis XL of the housing 3 when viewed from the axial direction X. As illustrated in FIG. 5, each of the outer portion 23a and the inner portion 23b is provided with a contact portion 27.

The contact portion 27 is formed of a conductive metal. In the connector 100 according to the present embodiment, the contact portion 27 is provided in each of the outer portion 23a and the inner portion 23b. These contact portions 27 are disposed line-symmetrically with respect to a plane that is parallel to the axis XL, includes a virtual line located at a center between the outer portion 23a and the inner portion 23b, and is orthogonal to the axial direction X. Therefore, the contact portion 27 provided in the inner portion 23b will be described below, and the description of the contact portion 27 provided in the first plate-shaped portion will be omitted.

As illustrated in FIGS. 5 and 6, the contact portion 27 has a frame-shaped portion 271, a plurality of spring contact portions 272, a pair of first bent portions 273a and 273b, and a pair of second bent portions 274a and 274b. The frame-shaped portion 271 is a portion that is formed in a rectangular frame shape, is provided on a facing surface of each of the outer portion 23a and the inner portion 23b in the first orthogonal direction Y, and comes in contact with the facing surface. The plurality of spring contact portions 272 are provided inside the frame-shaped portion 271. In each spring contact portion 272, an end portion of the front side of the axial direction X is connected to and supported by the frame-shaped portion 271, and an end portion of the rear side of the axial direction X becomes a free end and is supported in a cantilever shape to be elastically deformed with respect to the frame-shaped portion 271 in the axial direction X (see FIG. 2). The pair of first bent portions 273a and 273b face each other in the second orthogonal direction Z and are connected to the end portion of the frame-shaped portion 271 in the second orthogonal direction Z. The pair of second bent portions 274a and 274b face the frame-shaped portion 271 in the first orthogonal direction Y and are connected to the end portions of the first bent portions 273a and 273b in the first orthogonal direction Y.

The wire connection portion 24 is a portion that is electrically connected to the first wire 11 by coming into contact with a first core wire 1a of the first wire 11 illustrated in FIG. 6. As illustrated in FIG. 1, the wire connection portion 24 is a portion that is located on the rear side of the axial direction X and is exposed to the outside from the cover 4 to be described later. The wire connection portion 24 is formed in a C shape having a pair of wire connection facing portions 24a and 24b and a connection coupling portion 24c when viewed from the axial direction X. The pair of wire connection facing portions 24a and 24b face each other in the second orthogonal direction Z. The wire connection facing portions 24a and 24b have connection through-holes 24a1 and 24b1 penetrating the wire connection facing portions 24a and 24b with respect to the second orthogonal direction Z, respectively. The connection coupling portion 24c is formed in a flat plate shape, is disposed so that the plate thickness direction is along the first orthogonal direction Y, and connects the pair of wire connection facing portions 24a and 24b.

The tubular portion 25 is formed in a tubular shape that is located between the terminal connection portion 23 and the wire connection portion 24 in the axial direction X and has an accommodation space portion (space portion) 25s. More specifically, the tubular portion 25 is formed in a square tubular shape. The tubular portion 25 is adjacent to the terminal connection portion 23 and adjacent to the wire connection portion 24 in the axial direction X.

The wire connection portion 24 of the terminal 2 is electrically connected to the wire 1. More specifically, the wire connection facing portion 24a in the wire connection portion 24 is electrically connected to the end of the wire 1 by contacting the first core wire 1a of the wire 1 to be described later. The connector 100 of the present embodiment includes a plurality of terminals 2, and each terminal 2 is electrically connected to the first core wire 1a located at the end of each wire 1. Note that, in the present embodiment, the two wires 1 have the same configuration. Therefore, the first wire 11 to be one of the two wires 1 will be described below, and the description of the second wire 12 to be the remaining wire 1 will be omitted.

The first wire 11 has a first core wire 1a that is formed of a conductive material and an insulating first covering portion 1b that covers a peripheral surface of the first core wire 1a. In the end of the first wire 11, the first covering portion 1b is removed to expose the first core wire 1a, and the first terminal 21 is connected to an exposed portion of the first core wire 1a.

The housing 3 is formed of an insulating synthetic resin and accommodates at least a part of the terminal 2, and includes the cover 4 and the holding member 5 as illustrated in FIG. 3.

As illustrated in FIG. 2, the cover 4 covers the outside of a pair of terminals 2 separated in the first orthogonal direction Y and includes a rear-side cover portion 41 and a front-side cover portion 42, and the rear-side cover portion 41 and the front-side cover portion 42 are integrally formed. Further, as illustrated in FIG. 1, the cover 4 has a first packing P1, a first holder 6, a second packing P2, and a second holder 7 assembled on an outer peripheral surface of the cover 4.

As illustrated in FIG. 7, the rear-side cover portion 41 is formed in a tubular shape and covers the outside of the tubular portion 25 of the terminal 2. As illustrated in FIG. 3, an assembling protrusion portion 41a, a first cover engagement recess portion 41b, and a second cover engagement recess portion 41c are formed on an outer peripheral surface of the rear-side cover portion 41.

The assembling protrusion portion 41a is formed so as to protrude outward in a radial direction from the outer peripheral surface of the rear-side cover portion 41. The cover 4 of the present embodiment has four assembling protrusion portions 41a. As illustrated in FIG. 7, each of the assembling protrusion portions 41a has an assembling through-hole 411 that penetrates the assembling protrusion portion 41a in the axial direction X. By inserting a tip of a bolt into the assembling through-hole 411 and then screwing a nut into a screw portion of the bolt, an operator attaches the connector 100 to an attachment target. Further, the operator attaches the counterpart connector 110 to the attachment target to electrically connect the terminal 2 and the counterpart terminal 111, and assembles the connector 100 to the counterpart connector 110.

Further, as illustrated in FIG. 2, the rear-side cover portion 41 has a through-hole 41s that penetrates the rear-side cover portion 41 in the axial direction X. In addition, in the rear-side cover portion 41, a nut 49 is provided in a portion where the through-hole 41s is formed. The nut 49 has a screw hole 49a that penetrates the nut 49 in the axial direction X.

The front-side cover portion 42 covers a non-facing surface of the outer portion 23a and a non-facing surface of the inner portion 23b in the terminal connection portion 23.

The first packing P1 is formed in an annular shape by an elastic material such as synthetic rubber, for example, and can be elastically deformed inward in the radial direction. The first packing P1 is located on the rear side with respect to the assembling protrusion portion 41a in the axial direction X, and prevents a foreign material such as rainwater from entering the inside of the connector 100 from the outer peripheral surface of the wire 1, for example. The first packing P1 is assembled to the outer peripheral surface of the rear-side cover portion 41 by the first holder 6.

The first holder 6 is formed in an annular shape by an insulating synthetic resin, for example, and has a first engagement claw 61 illustrated in FIG. 3 that engages with the first cover engagement recess portion 41b described above. The first holder 6 of the present embodiment has four first engagement claws 61. The first holder 6 is located on the rear side with respect to the assembling protrusion portion 41a in the axial direction X, and the first engagement claw 61 engages with the first cover engagement recess portion 41b to assemble the first packing P1 to the outer peripheral surface of the rear-side cover portion 41.

The second packing P2 is formed in an annular shape by an elastic material such as synthetic rubber, for example, and can be elastically deformed inward in the radial direction. The second packing P2 is located on the front side with respect to the assembling protrusion portion 41a in the axial direction X, and prevents a foreign material such as rainwater from entering the inside of the connector 100 and the inside of the counterpart connector 110 from a portion between the counterpart connector 110 and the connector 100. The second packing P2 is assembled to the outer peripheral surface of the rear-side cover portion 41 by the second holder 7.

The second holder 7 is formed in an annular shape by an insulating synthetic resin, for example, and has a second engagement claw 71 that engages with the second cover engagement recess portion 41c described above. The second holder 7 of the present embodiment has four second engagement claws 71. The second holder 7 is located on the front side with respect to the assembling protrusion portion 41a in the axial direction X, and the second engagement claw 71 engages with the second cover engagement recess portion 41c to assemble the second packing P2 to the outer peripheral surface of the rear-side cover portion 41.

As illustrated in FIG. 2, the holding member 5 has a base portion 51, a washer 52, a pressing arm portion 53, and a holding arm portion 54. That is, the housing 3 has the base portion 51, the pressing arm portion 53, and the holding arm portion 54, which are integrally formed. The holding member 5 of the present embodiment has one base portion 51, one washer 52, a pair of pressing arm portions 53A and 53B, and a pair of holding arm portions 54a and 54b. In the holding member 5, the washer 52 is embedded and integrated inside the base portion 51 by insert molding or the like, for example.

The base portion 51 holds the temperature sensor 8 movably in at least the first orthogonal direction Y in a housing formation space portion 5s to be described later. As illustrated in FIG. 6, the base portion 51 has a terminal fixing portion 51a and a guide portion 51b.

The terminal fixing portion 51a is located between the pair of terminals 2 in the first orthogonal direction Y, and the pair of terminals 2 are fixed. The terminal fixing portion 51a is formed in a substantially rectangular parallelepiped shape, and as illustrated in FIG. 2, the terminal fixing portion 51a has a columnar fixing portion first through-hole 51a1 penetrating the terminal fixing portion 51a in the axial direction X and a columnar fixing portion second through-hole 51a2 penetrating the terminal fixing portion 51a in the second orthogonal direction Z. The terminal fixing portion 51a of the present embodiment has one fixing portion first through-hole 51a1 and two fixing portion second through-holes 51a2. The fixing portion first through-hole 51a1 is formed, for example, at the center of the terminal fixing portion 51a in the first orthogonal direction Y and at the center in the second orthogonal direction Z. Further, in the terminal fixing portion 51a, the washer 52 described above is embedded in the middle of the fixing portion first through-hole 51a1 in the axial direction X. The washer 52 has a through-hole 52a that penetrates the washer 52 in the axial direction X. Further, the holding member 5 is provided with a bolt 59 to be inserted into the through-hole 52a of the washer 52. The bolt 59 has a screw portion 59a.

The two fixing portion second through-holes 51a2 are disposed line-symmetrically with respect to a plane orthogonal to the first orthogonal direction Y, about the axis XL, for example. Further, on one side of the terminal fixing portion 51a in the second orthogonal direction Z, as illustrated in FIG. 6, a fixing recess portion 51a3 recessed from one side to the other side of the second orthogonal direction Z is formed in a portion of the terminal fixing portion 51a provided with the fixing portion second through-hole 51a2. A highly rigid spacer 51a4 formed of a conductive metal is disposed in the fixing recess portion 51a3. The spacer 51a4 is formed in a shape of a rectangular flat plate that engages with the fixing recess portion 51a3. The spacer 51a4 has a spacer through-hole 51a5 that penetrates the spacer 51a4 in the second orthogonal direction Z.

By inserting the tip of the screw portion 28a of the bolt 28 into the connection through-hole 24a1, the spacer through-hole 51a5, the fixing portion second through-hole 51a2, and the connection through-hole 24b1 and then screwing the screw hole 29a of the nut 29 into the screw portion 28a of the bolt 28, the terminal fixing portion 51a fixes the terminal 2 to the holding member 5.

The guide portion 51b guides the pressing arm portion 53 to the accommodation space portion 25s of the terminal 2, when the pressing arm portion 53 is inserted into the accommodation space portion 25s of the terminal 2. The holding member 5 of the present embodiment has a pair of guide portions 51b. The guide portions 51b of the present embodiment have a pair of one-side guide portions 511 disposed on one side of the first orthogonal direction Y and an other-side guide portions 512 disposed on the other side of the first orthogonal direction Y, and these are disposed line-symmetrically with respect to a plane including the axis XL and orthogonal to the first orthogonal direction Y and have the same configuration. Therefore, the other-side guide portion 512 disposed on the other side of the first orthogonal direction Y in the two guide portions 51b will be described below, and the one-side guide portion 511 disposed on one side of the first orthogonal direction Y will be designated by the same reference numeral and the description thereof will be omitted.

The other-side guide portions 512 have a first guide arm portion 512a and a second guide arm portion 512b. The first guide arm portion 512a and the second guide arm portion 512b extend in a rod shape in the axial direction X, and protrude from the terminal fixing portion 51a to the front side of the axial direction X. In addition, the first guide arm portion 512a and the second guide arm portion 512b face each other in the second orthogonal direction Z with an other-side holding arm portion 54b, which will be described later, interposed therebetween. That is, the first guide arm portion 512a and the second guide arm portion 512b are located outside the pair of other-side holding arm portion 54b in the second orthogonal direction Z.

One first pressing arm portion 53A in the pair of pressing arm portions 53 is disposed on one side of the first orthogonal direction Y, and the other pressing arm portion 53B is disposed on the other side of the first orthogonal direction Y. The pair of pressing arm portions 53 of the present embodiment have one first pressing arm portion 53A disposed on one side of the first orthogonal direction Y and the other second pressing arm portion 53B disposed on the other side of the first orthogonal direction Y. In addition, these include the axis XL, and are disposed line-symmetrically with respect to a plane that is orthogonal to the first orthogonal direction Y, and have the same configuration. Therefore, in the following description, the configurations of the second pressing arm portion 53B will be described below, and the configurations of the first pressing arm portion 53A will be designated by the same reference numerals and description thereof will be omitted.

The second pressing arm portion 53B is formed in a rod shape extending from the terminal fixing portion 51a in the base portion 51 to the front side of the axial direction X and is elastically deformable with respect to the first orthogonal direction Y. Further, the second pressing arm portion 53B is disposed in the accommodation space portion 25s located inside the tubular portion 25. As illustrated in FIG. 8, if the second pressing arm portion 53B is disposed in the accommodation space portion 25s, a housing formation space portion 5s is formed by the second pressing arm portion 53B forming a part of the housing 3 and a wall portion 251 forming the tubular portion 25 of the terminal 2. Further, the second pressing arm portion 53B has a protrusion portion 531 that protrudes into the housing formation space portion 5s and comes into contact with the temperature sensor 8.

The protrusion portion 531 is formed at the end portion (that is, the tip portion) of the second pressing arm portion 53B on the front side of the axial direction X as illustrated in FIG. 6, and protrudes in a direction away from the axis XL in the first orthogonal direction Y as illustrated in FIG. 8. As illustrated in FIG. 2, when the protrusion portion 531 comes into contact with the temperature sensor 8, the pressing arm portion 53 is elastically deformed to press the temperature sensor 8 located in the housing formation space portion 5s with respect to the first orthogonal direction Y, and the pressed temperature sensor 8 is brought into contact with the wall portion 251 (see FIG. 8) of the terminal 2.

Further, the base portion 51 is provided with a pair of holding arm portions 54. The pair of holding arm portions 54 face each other in the second orthogonal direction Z and are elastically deformable with respect to the first orthogonal direction Y. The base portion 51 of the present embodiment is provided with two pairs of holding arm portions 54. The two holding arm portions 54 have a one-side holding arm portion 54*a* disposed on one side of the first orthogonal direction Y and an other-side holding arm portion 54*b* disposed on the other side of the first orthogonal direction Y. In addition, these include the axis XL, and are disposed line-symmetrically with respect to a plane that is orthogonal to the first orthogonal direction Y, and have the same configuration. Therefore, in the following description, the configurations of the other-side holding arm portion 54*b* will be described below, and the configurations of the one-side holding arm portion 54*a* will be designated by the same reference numerals and description thereof will be omitted.

The other-side holding arm portion 54*b* has a first holding arm portion 541 and a second holding arm portion 542 as illustrated in FIG. 9. The first holding arm portion 541 is formed so as to extend in the axial direction X, a holding base end portion 541*a* located on the rear side is connected to the first guide arm portion 512*a*, and a holding tip portion 541*b* located on the tip side is a free end. Therefore, the holding tip portion 541*b* of the first holding arm portion 541 can be elastically deformed with respect to the first orthogonal direction Y. Further, in the second orthogonal direction Z, a gap 541*s* is formed between the first guide arm portion 512*a* and the first holding arm portion 541. Therefore, the holding tip portion 541*b* of the first holding arm portion 541 can be elastically deformed in a direction close to the first guide arm portion 512*a* by the gap 541*s* in the second orthogonal direction Z.

The second holding arm portion 542 is formed so as to extend in the axial direction X, a holding base end portion 542*a* located on the rear side is connected to the second guide arm portion 512*b*, and a holding tip portion 542*b* located on the tip side is a free end. For this reason, the second holding arm portion 542 can be elastically deformed with respect to the first orthogonal direction Y. Therefore, the pair of other-side holding arm portions 54B can be elastically deformed with respect to the first orthogonal direction Y. Further, in the second orthogonal direction Z, a gap 542*s* is formed between the second guide arm portion 512*b* and the second holding arm portion 542. Therefore, the holding tip portion 542*b* of the second holding arm portion 542 can be elastically deformed in a direction close to the second guide arm portion 512*b* by the gap 542*s* in the second orthogonal direction Z.

In the other-side holding arm portion 54*b*, in a state where the second pressing arm portion 53B is inserted into the accommodation space portion 25*s* and the housing formation space portion 5*s* is formed, the holding tip portions 541*b* and 542*b* face each other with the housing formation space portion 5*s* interposed therebetween in the second orthogonal direction Z.

The temperature sensor 8 is, for example, a thermistor and is a sensor that detects the temperature of the terminal 2 coming in contact with the temperature sensor 8 by utilizing the property of a temperature detection element 82 illustrated in FIG. 2 in which electric resistance changes in response to a change in the temperature. The temperature sensor 8 is disposed in the accommodation space portion 25*s* of the terminal 2. As illustrated in FIGS. 6 and 8, the temperature sensor 8 has a sensor cover 81, a temperature detection element 82 (see FIG. 2), a pair of sensor wires 83A and 83B, and a potting agent 84 (see FIG. 2).

The sensor cover 81 has a cover body portion 81*a* that is formed of an insulating synthetic resin and has an element accommodation space portion 81*s* (see FIG. 2) provided inside. The cover body portion 81*a* is formed in a rectangular shape when viewed from the first orthogonal direction Y, and has a cover opening portion 81*b* and a wide portion 81*c*. The cover opening portion 81*b* causes the element accommodation space portion 81*s* to communicate with the outside and is disposed on the rear side of the cover body portion 81*a* in the axial direction X. The wide portion 81*c* is a rear end portion of the cover body portion 81*a* in the axial direction X and is a portion that is formed to protrude from both end portions in the second orthogonal direction Z. In addition, a width of the wide portion 81*c* in the second orthogonal direction Z is larger than a width of the cover body portion 81*a* in the second orthogonal direction Z.

The temperature detection element 82 is disposed in the element accommodation space portion 81*s*. One end of the pair of sensor wires 83A and 83B is electrically connected to the temperature detection element 82. The potting agent 84 is formed by curing a liquid synthetic resin having an insulating property, and is filled in the element accommodation space portion 81*s* in a state where the temperature detection element 82 is disposed in the element accommodation space portion 81*s*. The temperature sensor 8 having the above configuration outputs the electric resistance of the temperature detection element 82 via the pair of sensor wires 83A and 83B, and the temperature of the terminal 2 is detected on the basis of the electric resistance. The connector 100 of the present embodiment includes a pair of temperature sensors 8 corresponding to the pair of terminals 2.

The temperature sensor 8 is held movably in the first orthogonal direction Y by the holding structure 9. The holding structure 9 is provided with a pair of locking projections 95 and a pair of locking recess portions 96.

The pair of locking projections 95 are provided in the holding arm portion 54 and extend in the second orthogonal direction Z. The holding structure 9 of the present embodiment is provided with two pairs of locking projections 95. The two locking projections 95 face each other in the first orthogonal direction Y, and has a one-side locking projection 95A disposed on one side of the first orthogonal direction Y and an other-side locking projection 95B disposed on the other side of the first orthogonal direction Y. In addition, these are disposed line-symmetrically with respect to a plane that includes the axis XL and is orthogonal to the first orthogonal direction Y and have the same configuration. Therefore, in the following description, the configurations of the other-side locking projection 95B will be described below, and the configurations of the one-side locking projection 95A will be designated by the same reference numerals and description thereof will be omitted.

The other-side locking projection 95B has a first locking projection 951 and a second locking projection 952. The first locking projection 951 and the second locking projection 952 are formed on the facing surfaces of the first holding arm portion 541 and the second holding arm portion 542 in the second orthogonal direction Z. More specifically, the first locking projection 951 is formed in the holding tip portion 541*b* of the first holding arm portion 541, and the second locking projection 952 is formed in the holding tip portion 542*b* of the second holding arm portion 542.

As illustrated in FIG. 9, the first locking projection 951 has an inclined surface 951a and an orthogonal surface 951b that face each other in the axial direction X. The inclined surface 951a is located on the rear side of the axial direction X and is inclined with respect to the axial direction X and the second orthogonal direction Z. The orthogonal surface 951b is located on the front side of the axial direction X and is orthogonal to the flat facing surface of the first holding arm portion 541.

The second locking projection 952 has an inclined surface 952a and an orthogonal surface 952b that face each other in the axial direction X. The inclined surface 952a is located on the rear side of the axial direction X and is inclined with respect to the axial direction X and the second orthogonal direction Z. The orthogonal surface 952b is located on the front side of the axial direction X and is orthogonal to the flat facing surface of the second holding arm portion 542.

As illustrated in FIG. 7, the pair of locking recess portions 96 are provided in the temperature sensor 8 and can engage with the locking projection 95 by moving the locking projection 95 in the second orthogonal direction Z. The holding structure 9 of the present embodiment is provided with two pairs of locking recess portions 96. The two locking recess portions 96 face each other in the first orthogonal direction Y, and have a one-side locking recess portion 96A disposed on one side of the first orthogonal direction Y and an other-side locking recess portion 96B disposed on the other side of the first orthogonal direction Y. In addition, these include the axis XL, and are disposed line-symmetrically with respect to a plane that is orthogonal to the first orthogonal direction Y, and have the same configuration. Therefore, in the following description, the configurations of the other-side locking recess portion 96B will be described below, and the configurations of the one-side locking recess portion 96A will be designated by the same reference numerals and description thereof will be omitted.

The other-side locking recess portion 96B has a first locking recess portion 961 and a second locking recess portion 962. The first locking recess portion 961 and the second locking recess portion 962 are formed on the facing surface of the temperature sensor 8 in the second orthogonal direction Z.

In the holding structure 9 of the present embodiment, a width W1 of the first locking recess portion 961 in the first orthogonal direction Y is larger than a width W2 of the first locking projection 951 in the first orthogonal direction Y. Further, a width W1 of the second locking recess portion 962 in the first orthogonal direction Y is larger than a width W2 of the second locking projection 952 in the first orthogonal direction Y. As a result, the temperature sensor 8 can move in the first orthogonal direction Y with respect to the base portion 51. That is, the holding structure 9 holds the temperature sensor 8 so as to be movable in the first orthogonal direction Y in the housing formation space portion 5s.

In the holding structure 9, in a state where the pair of locking projections 95 and the pair of locking recess portions 96 are engaged, the orthogonal surface 952b of the locking projection 95 and the flat surface configuring the locking recess portion 96 come into contact with each other, so that the temperature sensor 8 is restricted from moving to the rear side of the axial direction X with respect to the holding member 5. That is, the holding structure 9 is restricted from moving to one side of the axial direction X by engaging the pair of locking projections 95 and the pair of locking recess portions 96. Further, in the holding structure 9, the pair of locking projections 95 and the pair of locking recess portions 96 are provided in the pair of holding arm portions 54 and the temperature sensor 8 facing each other in the second orthogonal direction Z. As a result, the holding structure 9 can hold the temperature sensor 8 so as to be movable in the first orthogonal direction Y by the pair of holding arm portions 54, and the temperature sensor 8 is restricted from moving to the rear side in the second orthogonal direction Z.

The connector 100 having the above configuration is assembled, for example, as follows. First, as illustrated in FIG. 6, the operator disposes the two temperature sensors 8 on the rear side of the holding member 5 in the axial direction X.

Next, the operator moves the temperature sensor 8 from the rear side to the front side with respect to the holding member 5 in the axial direction X. When the temperature sensor 8 is moved from the rear side to the front side with respect to the holding member 5 in the axial direction X, first, the cover body portion 81a of the temperature sensor 8 is inserted between the pair of guide arm portions 512a and 512b in the second orthogonal direction Z. From this state, when the temperature sensor 8 is further moved from the rear side to the front side with respect to the holding member 5 in the axial direction X, the cover body portion 81a of the temperature sensor 8 is inserted between the pair of holding arm portions 54.

Then, from this state, when the temperature sensor 8 is further moved from the rear side to the front side with respect to the holding member 5 in the axial direction X, the temperature sensor 8 comes into contact with the protrusion portion 531 of the pressing arm portion 53, and the pressing arm portion 53 is elastically deformed. More specifically, the protrusion portion 531 comes into contact with the temperature sensor 8, so that the pair of pressing arm portions 53A and 53B are elastically deformed in a direction close to each other in the first orthogonal direction Y.

From this state, when the temperature sensor 8 is further moved from the rear side to the front side with respect to the holding member 5 in the axial direction X, the inclined surfaces 951a of the pair of locking projections 95 come into contact with the facing surface of the temperature sensor 8 in the second orthogonal direction Z. When the inclined surfaces 951a of the pair of locking projections 95 come into contact with the facing surface of the temperature sensor 8 in the second orthogonal direction Z, the holding tip portions 541b and 542b of the pair of holding arm portions 54 are elastically deformed so as to be separated in the second orthogonal direction Z.

From this state, when the temperature sensor 8 is further moved from the rear side to the front side with respect to the holding member 5 in the axial direction X, the pair of locking projections 95 get over the wall portion of the temperature sensor 8 on the front side of the axial direction X, and the pair of locking projections 95 move in the second orthogonal direction Z, so that the pair of locking projections 95 engage with the pair of locking recess portions 96. Then, the pair of holding arm portions 54 recover from the elastically deformed state. As a result, the holding structure 9 holds the temperature sensor 8 so as to be movable in the first orthogonal direction Y, and the temperature sensor 8 is attached to the holding member 5 as illustrated in FIG. 10.

Next, as illustrated in FIG. 6, the operator disposes the two terminals 2 on the front side of the holding member 5 in the axial direction X. Then, the operator moves the terminal 2 to the rear side in the axial direction X with respect to the holding member 5.

The operator further moves the terminal 2 to the rear side in the axial direction X with respect to the holding member 5, and accommodates the guide arm portions 512a and 512b, the holding arm portions 5A and 5B, and the pressing arm portions 53A and 53B in the accommodation space portion 25s of the terminal 2.

Then, the operator aligns the terminal fixing portion 51a of the holding member 5 and the wire connection portion 24 of the terminal 2 in the axial direction X. After that, by inserting the tip of the screw portion 28a of the bolt 28 into the connection through-hole 24a1, the spacer through-hole 51a5, the fixing portion second through-hole 51a2, and the connection through-hole 24b1 and then screwing the screw hole 29a of the nut 29 into the screw portion 28a of the bolt 28, the operator fixes the terminal 2 to the holding member 5.

Next, the operator disposes the holding member 5 on the front side of the cover 4 in the axial direction X as illustrated in FIG. 3. Then, from this state, the holding member 5 is moved from the front side to the rear side with respect to the cover 4 in the axial direction X, and the screw portion 59a of the bolt 59 is inserted into the through-hole 52a of the washer 52. After that, the screw hole 49a of the nut 49 is screwed into the screw portion 59a of the bolt 59. As a result, the holding member 5 is fixed to the cover 4 to form the housing 3.

Next, by inserting the tip of the bolt into the assembling through-hole 411 of the cover 4 and then screwing the nut into the screw portion of the bolt, the operator attaches the connector 100 to the attachment target. Finally, the operator attaches the counterpart connector 110 to the attachment target to electrically connect the terminal 2 and the counterpart terminal 111, and assembles the connector 100 to the counterpart connector 110.

The connector 100 according to the present embodiment has the following configuration. The temperature sensor 8 is disposed in the accommodation space portion (space portion) 25s of the terminal 2. The tubular portion 25 is accommodated inside the housing 3 in a state where the terminal 2 is held by the housing 3. Therefore, the connector 100 according to the present embodiment effectively uses the accommodation space portion 25s of the tubular portion 25 and uses a part of the space accommodating a part of the terminal 2 as the space accommodating the temperature sensor 8, so that it is possible to eliminate the space for accommodating the temperature sensor 8 inside the housing 3. As a result, in the connector 100 according to the present embodiment, since it is not necessary to separately provide the space for accommodating a part of the terminal 2 and the space for accommodating the temperature sensor 8 inside the housing 3, the housing 3 can be miniaturized. Therefore, it is possible to provide a small connector 100.

The connector 100 according to the present embodiment has the following configuration. The terminal 2 is formed of a single conductive metal plate-shaped member in a deployed state. Therefore, in the connector 100 according to the present embodiment, the terminal 2 having the tubular portion 25 can be manufactured inexpensively and easily.

The connector 100 according to the present embodiment has the following configuration. The housing 3 holds the plurality of terminals 2. The temperature sensor 8 is disposed in the accommodation space portion 25s of each terminal 2. Therefore, in the connector 100 according to the present embodiment, the terminal 2 is provided to correspond to the temperature sensor 8, and the temperature sensor 8 is accommodated in the accommodation space portion 25s of the tubular portion 25 of each terminal 2. As a result, in the connector 100 according to the present embodiment, the terminal 2 individually protects the temperature sensor 8 accommodated inside, so that it is possible to suppress an influence of heat generated from other terminal 2 on the temperature sensor 8 accommodated in the accommodation space portion 25s of the terminal 2.

The connector 100 according to the present embodiment has the following configuration. The axis of the temperature sensor 8 is located inside the outer portion 23a of the terminal connection portion 23 when viewed from the axial direction X. Therefore, in the connector 100 according to the present embodiment, it is possible to eliminate an extra space outside the outer portion 23a of the terminal connection portion 23 in the first orthogonal direction Y, so that it is possible to miniaturize the housing 3. Therefore, it is possible to provide a smaller connector 100.

The connector 100 according to the present embodiment has the following configuration. The connector 100 has the holding structure 9 that holds the temperature sensor 8 so as to be movable in at least the first orthogonal direction Y in the housing formation space portion 5s. The housing 3 has the base portion 51 and the pressing arm portion 53 extending from the base portion 51 in the axial direction X and elastically deformable with respect to the first orthogonal direction Y orthogonal to the axial direction X. The pressing arm portion 53 has the protrusion portion 531 that protrudes into the housing formation space portion 5s and comes into contact with the temperature sensor 8. When the protrusion portion 531 comes into contact with the temperature sensor 8, the pressing arm portion 53 is elastically deformed to press the temperature sensor 8 located in the housing formation space portion 5s with respect to the first orthogonal direction Y, and the pressed temperature sensor 8 is brought into contact with the terminal 2. Therefore, in the connector 100 according to the present embodiment, the protrusion portion 531 presses the temperature sensor 8 with respect to the first orthogonal direction Y by the elastic restoring force of the elastically deformed pressing arm portion 53. Since the temperature sensor 8 is held by the holding structure 9 so as to be movable in the first orthogonal direction Y, at the time of being pressed by the protrusion portion 531, the temperature sensor 8 moves along the first orthogonal direction Y and comes into contact with the terminal 2. As a result, in the connector 100 according to the present embodiment, even when the temperature sensor 8 is misaligned with respect to the terminal 2 due to the vibration of the vehicle, following the misalignment, the protrusion portion 531 can bring the temperature sensor 8 into contact with the terminal 2, and a contact state of the temperature sensor 8 with respect to the terminal 2 can be maintained. Therefore, the connector 100 according to the present embodiment can properly detect the temperature of the terminal 2 by the temperature sensor 8 at all times. As a result, it is possible to prevent an overcurrent from the power supply to the electronic device, on the basis of a detection result of the temperature sensor 8. On the other hand, the conventional connector includes the first holder member, the second holder member, and the holding structure 9 that maintains a state in which the second holder member is locked to the first holder member. Further, in the conventional connector, the terminal 2 and the temperature sensor are disposed in the internal space portion located between the first holder member and the second holder member, the terminal 2 and the temperature sensor are sandwiched between the first holder member and the second holder member, the terminal 2 and the temperature sensor are brought into contact with each other by sandwiching, and the sandwiched state is maintained by the holding structure 9. For this reason, in the conventional connector, when the internal space portion located between the first holder member and the second holder member becomes larger due to a vibration such as traveling of the vehicle, a gap may be generated between the temperature sensor and the terminal 2, and the contact state of the temperature sensor with respect to the terminal 2 may not be maintained.

The connector 100 according to the present embodiment has the following configuration. The holding structure 9 has the pair of locking projections 95 that are provided on one side of the holding arm portion 54 and the temperature sensor 8 and extend in the second orthogonal direction Z, and the pair of locking recess portions 96 that are provided on the other side of the holding arm portion 54 and the temperature sensor 8 and can engage with the locking projections 95 by moving the locking projection 95 in the second orthogonal direction Z. The pair of holding arm portions 54 can be elastically deformed in a direction separated from each other in the second orthogonal direction Z, while the pair of holding arm portions 54 are restricted from being elastically deformed in a direction close to each other by the wall portion located in the second orthogonal direction Z of the temperature sensor 8. Therefore, in the holding structure 9 according to the present embodiment, the movement of the temperature sensor 8 with respect to the second orthogonal direction Z is restricted in a state where the connector 100 is offset by the vehicle. Further, when the temperature sensor 8 tries to move to one side of the axial direction X in a state where the pair of locking projections 95 and the pair of locking recess portions 96 are engaged, the locking projection 95 comes into contact with the wall portion of the locking recess portion 96 on the side of an opposite direction of the axial direction X, and the movement with respect to one side of the axial direction X is restricted. As a result, since the holding structure 9 according to the present embodiment can restrict the movement of the temperature sensor 8 with respect to the second orthogonal direction Z and the movement with respect to one side of the axial direction X, the protrusion portion 531 can be reliably brought into contact with the temperature sensor 8.

The connector 100 according to the present embodiment has the following configuration. The housing 3 includes the cover 4 and the holding member 5 formed separately from the cover 4. The holding member 5 has the base portion 51. The base portion 51 has the terminal fixing portion 51a which is located between the pair of terminals 2 in the first orthogonal direction Y and to which the pair of terminals 2 are fixed. The cover 4 covers the outside of the pair of terminals 2 that are separated in the first orthogonal direction Y. Therefore, by covering the outside of the pair of terminals 2 with the cover 4, the connector 100 according to the present embodiment can protect the terminals 2. Further, after confirming whether or not the temperature sensor 8 is properly held with respect to the base portion 51 in a state where the temperature sensor 8 is held by the base portion 51, the connector 100 according to the present embodiment can cover the outside of the pair of terminals 2 with the cover 4. As a result, in the connector 100 according to the present embodiment, the terminal 2 can be protected by the cover 4, and it can be confirmed whether or not the temperature sensor 8 is properly held by the base portion 51.

The connector 100 according to the present embodiment has the following configuration. The terminal 2 has the tubular portion 25 with the accommodation space portion 25s. The pressing arm portion 53 is disposed in the accommodation space portion 25s of the tubular portion 25. Incidentally, in the connector 100, the pair of counterpart terminals 111 come into contact with the pair of terminals 2, respectively, so that the pair of terminals 2 may be deformed so as to be separated from each other in the first orthogonal direction Y. However, in the connector 100 according to the present embodiment, the rigidity of the terminal 2 can be caused to be higher than the rigidity of the plate-shaped terminal 2 by the tubular portion 25. As a result, in the connector 100 according to the present embodiment, by increasing the rigidity of the terminal 2, it is possible to suppress deformation due to the terminal 2 coming into contact with the counterpart terminal 111, and it is possible to prevent a gap from being generated between the terminal 2 and the temperature sensor 8. As a result, the connector 100 according to the present embodiment can reliably maintain the contact state of the temperature sensor 8 with respect to the terminal 2.

The connector 100 according to the present embodiment has the following configuration. The connector 100 according to the present embodiment has the pair of pressing arm portions 53A and 53B facing each other in the first orthogonal direction Y, the protrusion portions 531 come into contact with the temperature sensor 8, so that the pair of pressing arm portions 53A and 53B are elastically deformed in a direction close to each other in the first orthogonal direction Y. Therefore, the elastic restoring force of the pair of pressing arm portions 53A and 53B takes a balance with respect to the holding member 5 in the first orthogonal direction Y, and can suppress the movement of the holding member 5 to one side of the first orthogonal direction Y.

The connector 100 according to the present embodiment has the following configuration. In the connector 100, when the holding member 5 is viewed from the axial direction X, the holding tip portions 541b and 542b of the pair of holding arm portions 54 face each other with the housing formation space portion 5s interposed therebetween in the second orthogonal direction Z, and the protrusion portion 531 of the pressing arm portion 53 is disposed on one side of the first orthogonal direction Y in the housing formation space portion 5s. Therefore, in the connector 100, the pressing arm portion 53 having the protrusion portion 531 and the pair of holding arm portions 54 holding the temperature sensor 8 are densely disposed, and the accommodation space portion 25s of the terminal 2 can be effectively used. As a result, the connector 100 can be miniaturized.

As the connector 100 according to the embodiment described above, the connector in which the housing 3 accommodates at least a part of the terminals 2 has been described. However, the connector 100 according to the present embodiment is not limited thereto, and the housing 3 may accommodate the entire terminals 2.

Further, as the connector 100 according to the embodiment described above, the connector 100 used in the connection mechanism for wire-to-wire connection has been described. However, the connector 100 according to the present embodiment is not limited thereto, and can be applied to a connector used in a connection mechanism for wire to electric device connection.

Further, as the connector 100 according to the embodiment described above, the connector in which the terminal 2 is a female terminal has been described. However, the connector 100 according to the present embodiment is not limited thereto, and can be applied to a connector in which the terminal 2 is a male terminal.

Further, as the connector 100 according to the embodiment described above, the connector in which the housing 3 includes the cover 4 and the holding member 5 formed separately from the cover 4 has been described. However, the connector 100 according to the present embodiment is not limited thereto, and may include the housing 3 in which the cover 4 and the holding member 5 are integrally formed. If the connector 100 includes this housing 3, it is not necessary to assemble the cover 4 and the holding member 5, so that it is possible to provide the connector 100 in which the assembly is easy.

Further, as the connector 100 according to the embodiment described above, the connector that has the holding structure 9 holding the temperature sensor 8 so as to be movable in the first orthogonal direction Y has been described. However, in the connector 100 according to the present embodiment, the holding structure 9 may not be provided, the temperature sensor 8 may be press-fitted between the protrusion portion 531 of the pressing arm portion 53 and the wall portion 251 of the terminal 2, and the temperature sensor 8 may be sandwiched between the protrusion portion 531 and the wall portion 251 of the terminal by the elastic restoring force of the pressing arm portion 53.

Further, as the connector 100 according to the embodiment described above, the connector in which the terminal 2 is assembled to the holding member 5 after the temperature sensor 8 is assembled to the holding member 5 has been described. However, the connector 100 according to the present embodiment is not limited thereto, and the temperature sensor 8 may be assembled to the holding member 5 after the terminal 2 is assembled to the holding member 5.

Further, as the connector 100 according to the embodiment described above, the connector in which the thermistor is used in the temperature sensor 8 has been described. However, the temperature sensor 8 of the connector 100 according to the present embodiment is not limited thereto, and in the temperature sensor 8, for example, a thermocouple may be used.

Since a connector according to the present embodiment has the above configuration, a housing can be miniaturized. Therefore, a small connector can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:
a conductive terminal that comes into contact with a counterpart terminal;
a temperature sensor that detects a temperature of the terminal; and
an insulating housing, wherein
the terminal includes a terminal connection portion that is electrically connected to the counterpart terminal, a wire connection portion that is electrically connected to a wire, and a tubular portion that is located between the terminal connection portion and the wire connection portion and is formed in a tubular shape having a space portion,
the temperature sensor is disposed in the space portion of the terminal, and
the tubular portion is accommodated inside the housing in a state where the terminal is held by the housing,
the housing is formed so as to extend along an axial direction,
the terminal connection portion has an outer portion located on an outermost side with respect to an axis of the housing in an orthogonal direction orthogonal to the axial direction when viewed from the axial direction, and
the temperature sensor is located inside the outer portion when viewed from the axial direction.

2. The connector according to claim 1, wherein
the housing holds a plurality of terminals, and
the temperature sensor is disposed in the space portion of each of the terminals.

3. The connector according to claim 1, wherein
the terminal is formed of a single conductive metal plate-shaped member in a deployed state.

4. The connector according to claim 3, wherein
the housing holds a plurality of terminals, and
the temperature sensor is disposed in the space portion of each of the terminals.

* * * * *